United States Patent [19]

Lantos

[11] 4,139,522

[45] Feb. 13, 1979

[54] STABILIZED ETHYLENE-CARBON MONOXIDE COPOLYMERS

[75] Inventor: Peter R. Lantos, Media, Pa.

[73] Assignee: Arco Polymers, Inc., Philadelphia, Pa.

[21] Appl. No.: 885,720

[22] Filed: Mar. 13, 1978

[51] Int. Cl.$^2$ .............................................. C08K 5/52
[52] U.S. Cl. ...................... 260/45.75 R; 260/45.75 P
[58] Field of Search .................... 260/63 CQ, 45.75 R

[56] References Cited

U.S. PATENT DOCUMENTS

| | | | |
|---|---|---|---|
| 2,865,883 | 12/1958 | Jackson | 260/45.75 R |
| 2,887,462 | 5/1959 | Van Oot | 260/45.75 R |
| 3,156,744 | 11/1964 | Mullins | 260/897 C |
| 3,929,727 | 12/1975 | Russell et al. | 260/45.95 F |
| 3,948,832 | 4/1976 | Hudgin | 260/63 CQ |
| 3,948,873 | 4/1976 | Hudgin | 260/63 CQ |

*Primary Examiner*—V. P. Hoke
*Attorney, Agent, or Firm*—Coleman R. Reap

[57] ABSTRACT

Ethylene-carbon monoxide copolymer compositions are stablized against degradation by the incorporation therein of manganous salts of phosphorus oxy acids.

4 Claims, No Drawings

STABILIZED ETHYLENE-CARBON MONOXIDE COPOLYMERS

BACKGROUND OF THE INVENTION

This invention relates to ethylene-carbon monoxide copolymers and more particularly to heat stable ethylene-carbon monoxide copolymer compositions.

Ethylene-carbon monoxide copolymers are of considerable interest because of their potential as engineering plastics. These materials have physical properties which are superior to many other materials commonly used in industry and, in addition, offer the advantage of low cost since carbon monoxide is readily available as a by-product in the manufacture of steel and can also be inexpensively prepared from other chemical processes.

In spite of the advantages offered by ethylenecarbon monoxide copolymers they have not attained commercial acceptance partly due to the fact that they have poor resistance to thermal degradation during post polymerization processing operations. Since polymeric end products such as films, sheets and shaped articles are mostly commonly made by heating and melting polymeric compositions and extruding or injection molding the melt it is very important that these compositions be able to withstand the temperatures encountered in such post forming operations. U.S. Pat. No. 3,156,744 discloses the use of dibasic lead phosphite as a stabilizer for ethylene-carbon monoxide copolymers.

SUMMARY OF THE INVENTION

Ethylene-carbon monoxide copolymer compositions have now been discovered which have greater resistance to thermal degradation. Accordingly, it is an object of the invention to present improved ethylene-carbon monoxide copolymer compositions. It is another object of the invention to present ethylene-carbon monoxide which have improved heat stability. It is another object of the invention to present ethylene-carbon monoxide copolymers which will not undergo serious cross-linking during post polymerization processing operations at elevated temperatures. These and other objects of the invention will become more apparent from the description and examples which follow.

In accordance with the present invention, the stability of ethylene-carbon monoxide copolymers is significantly improved by incorporating therein a small amount of a manganous salt of a phosphorus oxy acid. The preferred salt is manganous hypophosphite.

DESCRIPTION OF THE INVENTION

The molecular weight and chemical constitution of the ethylene-carbon monoxide copolymers treated in accordance with the invention are not critical and in general any ethylene-carbon monoxide copolymer can be stabilized by the disclosed stabilizers. The following details are intended to be descriptive and not limitative. The ethylene-carbon monoxide copolymer compositions most improved by the stabilizers of the invention are those having molecular weights in the range of about 500 to 50,000 or more and containing up to 50 weight percent carbon monoxide. The most useful ethylene-carbon monoxide copolymers contain about 1 to 50 weight percent carbon monoxide. As can be readily appreciated, the copolymer compositions may contain additional polymeric components which may be either physically admixed with the ethylene-carbon monoxide copolymer or chemically combined with the ethylene and carbon monoxide as components of the copolymer. Monomers which may be copolymerized with the ethylene and carbon monoxide include ethylenically unsaturated aliphatic or aromatic compounds including olefins, such as propylene, isobutylene, etc.; dienes such as butadiene, isoprene, etc.; acrylic monomers such as acrylic acid, methyl methacrylate, acrylonitrile, etc.; aromatic compounds such as styrene, vinyl toluene, etc. The additional polymeric component is usually present in amounts up to about 50% by weight.

The preparation of ethylene-carbon monoxide copolymers is well known and is described in detail in U.S. Pat. Nos. 2,495,286; 2,641,590; 3,083,184; 3,530,109; 3,694,412; 3,689,460; 4,024,325 and 4,024,326.

The stabilizers useful for use in ethylene-carbon monoxide copolymers in accordance with the invention are the manganous salts of oxy phosphorus acids. Exemplary of the acid salts suitable for use in the invention are manganous hypophosphite and manganous orthophosphite. The preferred stabilizer is manganous hypophosphite.

The manganous oxy phosphorus salts are effective in amounts of about 0.01% to about 10%, based on the total weight of ethylene-carbon monoxide copolymer in the composition. The preferred concentration of acid salt in the composition is about 0.05 to 5% based on the total weight of ethylene-carbon monoxide present in the composition.

The manganous oxy phosphorus acid salts may be used in combination with other stabilizers or antioxidants if desired. The amount of other stabilizer or antioxidant used in the composition may vary over the same range as the acid salts, i.e., about 0.01 to 10% and preferably about 0.05 to 5% based on the weight of ethylene-carbon monoxide in the polymeric composition.

The stabilizer or mixture of stabilizers can be incorporated into the compositions by any of the known methods. For instance, it may be incorporated into the polymerization mixture prior to or during the polymerization. This method has the advantage of stabilizing the polymer from the time it is formed. Alternatively, the stabilizer can also be incorporated into the polymer after completion of the polymerization. This is most conveniently accomplished by blending the stabilizer into the copolymer, which is usually in the form of a melt or fine particles. The stabilizer can be incorporated directly into the copolymer composition by blending. The method of incorporating the stabilizers into the copolymer composition is not considered to be critical.

Other additives such as fillers, extenders, plasticizers, coloring agents, other polymeric materials, etc. can be added to the copolymer compositions being stabilized. These are usually most conveniently added to the polymer after the polymerization.

The following examples illustrate specific examples of the invention. Unless otherwise indicated, parts and percentages are on a weight basis.

EXAMPLE I

A portion of ethylene-carbon monoxide copolymer containing 42% by weight carbon monoxide is worked in a blender (marketed by Brabender Company under the trademark Plasticorder) to determine its susceptibility to crosslinking. The blender is operated at a temperature of 200° C. and a speed of 75 revolutions per minute. After the copolymer has been worked in the blender for a period of eleven minutes its viscosity begins to rise, indicating that cross-linking of the copolymer is occurring.

EXAMPLE II

The procedure of Example I is repeated except that 0.05% by weight of the copolymer of manganous hypophosphite is added to the copolymer prior to working. The copolymer is worked for a period of nineteen minutes before any noticeable increase in viscosity occurs.

Example II illustrates that a considerable improvement in the resistance of the ethylene-carbon monoxide copolymer is imparted to the copolymer by incorporating therein small amounts of manganous hypophosite.

EXAMPLE III

The procedure of Example II is repeated except that manganous orthophosphite is substituted for the manganous hypophosite. A significant improvement in the resistance of the copolymer to cross-linking will be observed.

Although the invention is described with particular reference to specific embodiments, the scope of the invention is not limited thereto but is defined by the breadth of the appended claims.

I claim:

1. A stabilized ethylene-carbon monoxide copolymer composition containing about 0.01 to 10% based on the weight of polymer in the base composition of a manganous salt of an oxy phosphorus acid.

2. The composition of claim 1 wherein said manganous oxy phosphorus acid salt is selected from the group consisting of manganous hypophosphite, manganous orthophosphite and mixtures of these.

3. The composition of claim 1 wherein said salt is manganous hypophosphite and it is present in an amount of about 0.05 to 5% based on the weight of polymer in the composition.

4. The composition of claim 1 containing about 0.1 to 20% of a second stabilizer.